United States Patent [19]

Bell et al.

[11] Patent Number: 5,422,085
[45] Date of Patent: Jun. 6, 1995

[54] CATALYTIC CONVERSION OF INTERNAL COMBUSTION ENGINE EXHAUST GASES

[75] Inventors: James A. E. Bell, Oakville; Raymond A. Bradford, Woodbridge, both of Canada

[73] Assignee: Inco Limited, Toronto, Canada

[21] Appl. No.: 288,970

[22] Filed: Aug. 10, 1994

Related U.S. Application Data

[63] Continuation of Ser. No. 74,393, Jun. 10, 1993, abandoned.

[51] Int. Cl.⁶ .............................................. B01D 53/56
[52] U.S. Cl. ............................... 423/213.5; 423/239.1
[58] Field of Search ........................... 423/239.1, 213.5

[56] References Cited

U.S. PATENT DOCUMENTS

| | | | |
|---|---|---|---|
| 2,666,738 | 1/1954 | Kardos | 204/46 |
| 3,928,235 | 12/1975 | Goodell | 252/467 |
| 4,455,393 | 6/1984 | Domesle et al. | 502/347 |
| 4,515,758 | 5/1985 | Domesle et al. | 423/213.5 |
| 4,684,510 | 8/1987 | Harkins | 423/239.1 |
| 4,886,650 | 12/1989 | Perry | 423/239.1 |
| 5,055,278 | 8/1991 | Reidick | 423/239.1 |
| 5,106,802 | 4/1992 | Horiuchi et al. | 502/65 |
| 5,145,716 | 9/1992 | Paserin et al. | 427/55 |

FOREIGN PATENT DOCUMENTS

| | | |
|---|---|---|
| 0198435 | 10/1986 | European Pat. Off. . |
| 0445816 | 9/1991 | European Pat. Off. . |
| 0491358 | 6/1992 | European Pat. Off. . |
| 0491359 | 6/1992 | European Pat. Off. . |
| 2393145 | 12/1978 | France . |
| 50-45771 | 4/1975 | Japan ................. 423/239.1 |

OTHER PUBLICATIONS

E. S. Lox, B. H. Engler and E. Koberstein, "Diesel Emission Control", p. 291, Catalysis and Automotive Pollution Control II, Elsevier Science Publishers B.V., Amsterdam, Netherlands 1991. (no month).
G. E. Andrews, K. D. Bartle, S. W. Pang, A. M. Nurein, P. T. Williams, "Diesel/Water Emulsions, Influence on Ignition and Delay," Chemical Abstracts CA111(18):15781t 1989 (no month).
W. R. Wade, C. E. Hunter, F. M. Trinker, H. A. Cikanete, "Reduction of NOx and Particulate Emissions on the Diesel Combustion Process", 1987, Chemical Abstracts Ca 108(2):8559h 1987 (no month).
M. M. Wright, J. E. Smith, "Solid State Electrochemical Cell for NOx Reduction", Proc. Intersoc. Energy Convers., Eng., Conf. 27, vol. 4, pp. 4.321, 1992. (no month).
C. N. Montreuil, M. Shelef, "Selective Reduction of Nitric Oxide over Cu-ZSM-5 Zeolite by Water-Soluble Oxygen-Containing Organic Compounds", p. 11, Applied Catalysis B: Environmental, 1, Elsevier Science Publishers, B.V., Amsterdam, Netherlands, 1992. (no month).
D. R. Monroe, C. L. DiMaggio, D. D. Beck and F. A. Matekunas, "Evaluation of a Cu/Zeolite Catalyst to Remove NOx from Lean Exhaust", p. 195, SAE Catalyst and Emission Technology (SO-968), Intl. Congress and Exposition, 1993, Warrendale, Pa., 1993. March.
Database WPI—Section Ch, Week 7803, 1978.
Database WPI—Section Ch, Week 8208, 1982.
Patent Abstracts of Japan—vol. 7, No. 14 (C-146) 20 Jan. 1983.
Patent Abstracts of Japan—vol. 16, No. 239 (M-1258) 2 Jun. 1992.

*Primary Examiner*—Ferris Lander
*Assistant Examiner*—Stuart L. Hendrickson
*Attorney, Agent, or Firm*—Edward A. Steen

[57] ABSTRACT

A technique for substantially reducing nitrogen oxide ($NO_x$) emissions in internal combustion engine exhaust gases. The $NO_x$ laden stream is contacted with a A5 catalytic material supported on a metal plated Ni foam substrate in the presence of a reducing agent. The $NO_x$ is reduced to nitrogen, water and/or carbon, and carbon dioxide.

2 Claims, 2 Drawing Sheets

CATALYTIC CONVERSION OF INTERNAL COMBUSTION ENGINE EXHAUST GASES

This is a continuation of application Ser. No. 08/074,393, filed on Jun. 10, 1993, now abandoned.

TECHNICAL FIELD

The instant invention relates to exhaust gas treatment systems in general and, more particularly, to catalytic techniques for substantially reducing noxious exhaust components generated by diesel engines.

BACKGROUND ART

It has been widely recognized that exhaust emissions from internal combustion engines are directly hazardous to the health of living organisms and to the environment. As a result, diesel engine emissions of nitrogen oxides ($NO_x$) and particulates from diesel engines, which traditionally have been afforded more lenient treatment than Otto cycle engines, are increasingly being regulated by governmental agencies.

Accordingly, various techniques are under active consideration to reduce noxious emissions emanating from these engines. Concepts include engine modifications and improvements, alternate and reformulated fuels (i.e., hydrogen), and exhaust after treatment devices such as traps, catalyzed traps and catalytic converters.

Unfortunately, engines modified or improved to reduce $NO_x$ emissions usually have increased particulate emissions. On the contrary, methods for reducing particulates generally increase $NO_x$ emissions.

Surveys of the art appear to reflect that most of the work has been concentrated on the reduction of particulate emissions. This avenue of attack includes filter traps, catalytic and fuel additive systems designed to reduce fast ignition temperature and regeneration. On the other hand, work on $NO_x$ reduction from diesel engines has been somewhat limited. It is surmised that this difficult problem has been exacerbated by high oxygen levels in the exhaust stream. With the introduction of new and tighter standards scheduled to become effective in the near future, $NO_x$ reduction in diesel exhausts will require new catalytic systems capable of functioning effectively in high oxygen atmospheres.

Though a number of stationary systems have been successfully commissioned, no similar systems appear to exist in the transportation sector. The catalytic reduction of $NO_x$ by $NH_3$ (ammonia) over a copper catalyst has been effectively demonstrated where fossil fuels are used to heat boilers, reactors, etc. It is not applicable to vehicles mainly because of the potential hazard posed by the on board storage of $NH_3$, and to a lesser extent, because of the effects of low $NH_3$ vapor pressures on the highly controlled delivery system required to match the rapid variations in $NO_x$ content during operation. In the laboratory, tests suggested that Cu and $NH_3$ incorporated into zeolite resins may be effective in the catalytic reduction of $NO_x$. However, its effectiveness as a $deNO_x$ catalyst seemed limited by its durability. Though the influence of diesel fuel-water emulsions (water/fuel ratios $\leq 0.25$) on particulates and $NO_x$ is very significant, large increases of carbon monoxide (CO) and condensibles (polynuclear aromatic hydrocarbons [PAH]) make the process unattractive. Relatively small amounts of water in the emulsions give very large reductions in $NO_x$ and particulates.

A recent publication claimed to have electrocatalytically reduced $NO_x$ emissions from vehicles fueled by natural gas. See Marshalla M. Wright, et al, "Solid State Electrochemical Cell for Nitrogen Oxide ($NO_x$) Reduction" Proc. Intersoc. Energy Convers. Eng. Conf. 27, Volumes 4, pages 4.321–4.325 (1992). The cathodes describe a honeycomb shaped ceramic coated with silver (or silver containing conducting material) in two distinct regions so that a cathode and anode were formed with an applied voltage across the system. Electrocatalytic reduction at the cathode resulted in the $NO_x$ going to $N_2$ and 2O, as the exhaust gas flowed through the channels. The $N_2$ continued through the cell while the O ions, dissolved in the solid electrolyte, usually consisting of zirconia ($ZrO_2$), hafnia (HfO), titania ($TiO_2$), or the lanthanide oxides, were converted to $O_2$ at the anode. Although promising, this is very new technology and must yet clear several obstacles before it can be considered viable.

U.S. Pat. No. 5,106,802 discloses a diesel engine catalyst employing a honeycomb structure. A number of catalytic materials including silver are enumerated.

SUMMARY OF THE INVENTION

Accordingly, there is provided a method for substantially reducing objectionable components, particularly $NO_x$, from exhaust gas streams of internal combustion engines.

The instant invention is particularly applicable to diesel engine exhaust gases having oxygen levels considerably greater than those of an Otto engine operating at or around the stoichiometric burn. The exhaust gases are contacted with a metallic catalyst supported on a sponge-like metallic substrate such as nickel plated polymeric foam to which sufficient reducing agents ($HN_3$, urea [$HN_2CONH_2$], CO, or hydrocarbon fuels [hexane, butane, methane, natural gas, etc.]) are added to catalytically reduce $NO_x$ to $N_2$ and water or $CO_2$.

PREFERRED MODE FOR CARRYING OUT THE INVENTION

Figure 1:
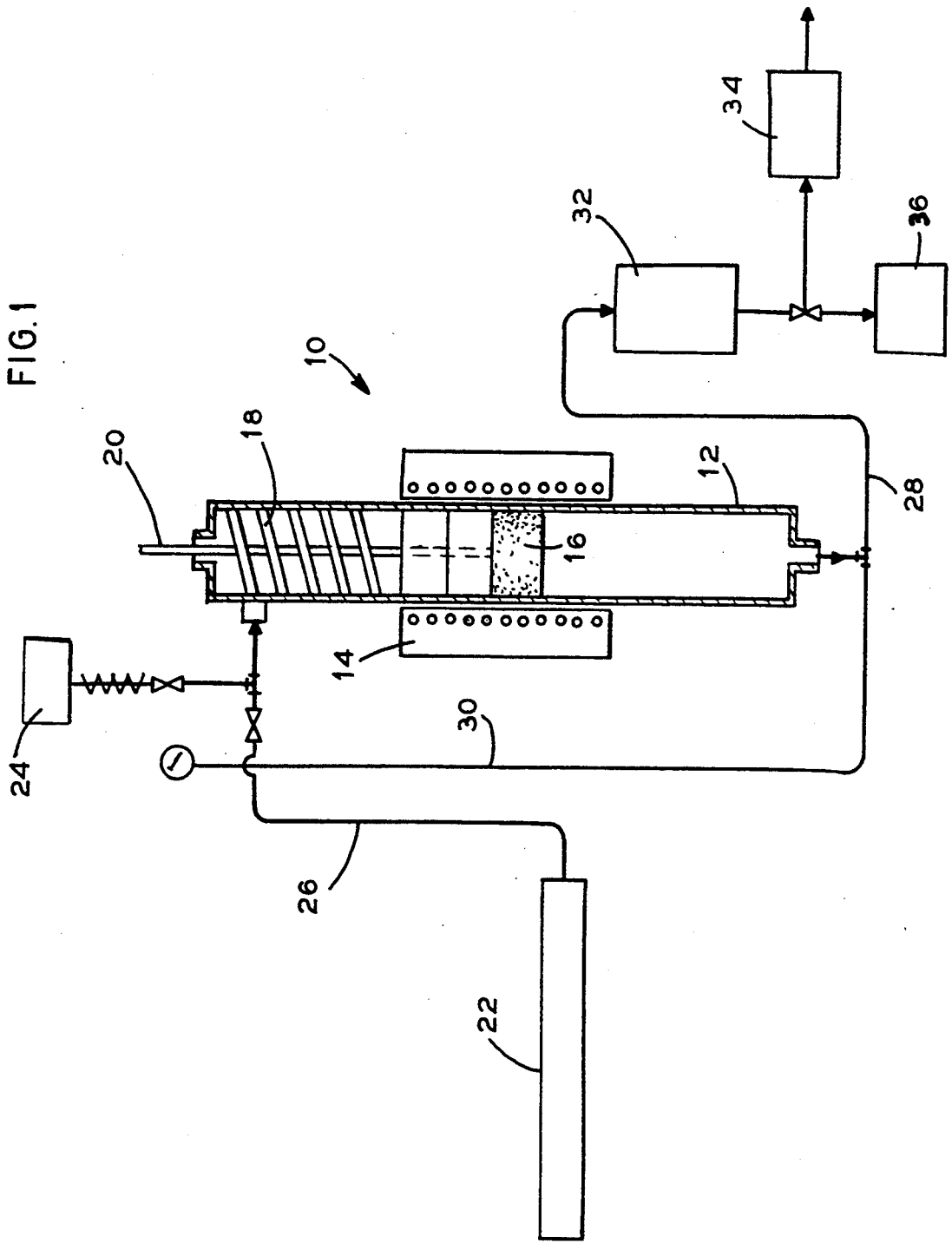
FIG. 1 is an elevation of an embodiment of the invention.

FIG. 1 depicts a laboratory exhaust gas catalytic converter assembly 10. The converter 10 includes a reactor 12. For testing purposes the reactor 12 is shown disposed within a furnace 14. During engine usage, the high temperature of the exhaust gases would be sufficient to heat the reactor 12.

A metallic catalyst 16, preferably metallic silver, supported by the nickel sponge is disposed within the reactor 12. Heating tape 18 preheats the upstream portion of the reactor 12. This serves to assist in raising the entrance temperature of the gases entering the reactor 12. A thermocouple 20 measures the temperature of the interior reactor 12.

A source of exhaust gas 22 is connected to the reactor 12. A source of water vapor 24 is tapped into an input line 26. The gas exits the reactor 12 through outlet line 28. A by-pass line 30 optionally mutes the exhaust gas around the reactor 12 to the outlet line 28.

In order to analyze the composition of the exhaust gas after catalytic treatment, the outlet line 28 leads to a water cooled condenser 32. The condensed gases then flow into a gas analyzer 34 and then out. Alternatively, the gases may be directly routed to a vent 36.

Figure 2:
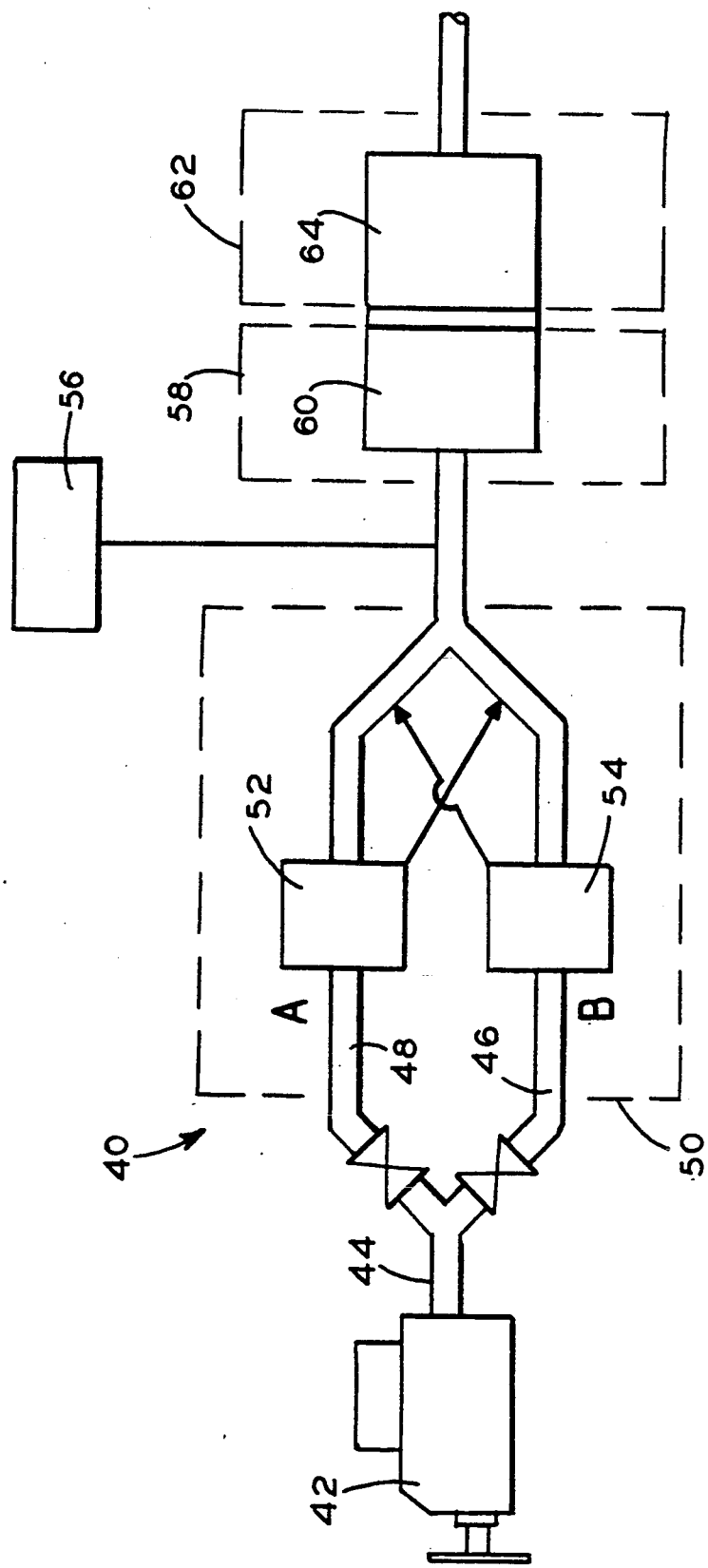
FIG. 2 is a schematic diagram of an embodiment of the invention.

FIG. 2 depicts in schematic fashion, a three stage catalytic converter 40 attached to a diesel engine 42. It will be appreciated, however, that the terms stage or zone are merely for discussion. They are not limiting terms.

An exhaust manifold 44 preferably splits the exhaust flow into two pathways 46 and 48 leading to a first zone 50. Two particulate (soot) filters 52 and 54 of known design trap the particulates. The filters 52 and 54 may be sequentially or simultaneously regenerated to generate carbon monoxide. The carbon monoxide, a reducing agent, is introduced into the exhaust stream. One filter may be lighted off so as to be regenerated and produce CO while the other continues to operate. Logic and sensory means may be used to selectively control the filters 52 and 54.

The filtered exhaust stream, augmented by the CO or alternatively by other reducing agents (urea, fuel, hexane etc.) from source 56, flows into the second zone 58. The second zone 58 includes the catalytic foam substrate 60 as discussed herein.

After the gases are "denoxed" (that is, treated to remove $NO_x$), the stream is then routed through a third zone 62 housing an oxidizing catalyst 64. The catalyst 64, generally made from platinum, will treat and substantially remove most of the remaining CO.

The treated gas, sans $NO_x$, CO and hydrocarbons, is routed to a muffler (not shown) and then out to the atmosphere.

The instant invention provides a method for the reduction of nitrogen oxides present in exhaust gases, particularly diesel exhausts.

In general, the exhaust stream is contacted with a catalyst comprising a metal or alloy including the metals of Groups I-B and VIII, supported on a sponge-like metallic substrate in the presence of sufficient reducing agent within a temperature range of 200° C. to 600° C. It is preferred to utilize a plated nickel foam substrate made in accordance with U.S. Pat. No. 5,195,716.

In essence, in order to produce the catalyst nickel carbonyl is decomposed so as to deposit metallic nickel onto a polymeric foam. The nickel plates out within the interstices of the foam to form a nickel coated foam or sponge. The carbonyl plating process is amenable to laying down other metals onto the substrate.

The resulting nickel foam has a huge internal surface area capable of holding the subsequently plated catalytic material. It may be appreciated that the gases flowing within the foam will course through tortuous paths. This action permits repeated contacts between the gases and the catalyst.

In a more specific embodiment of the present invention, there is provided a method for treating diesel exhaust gases in a multiple zone system operating at a preferred temperature of about 400° C. In zone one 50, particulates are filtered and removed from the exhaust gases. Commercially available carbon particulate traps cleanse the stream. In zone two 58, as the gases pass over a metallic silver catalyst supported by the metallic nickel sponge, carbon monoxide or some other reducing agent introduced into the stream, catalytically reduces the $NO_x$ to $N_2$ and $CO_2$. The CO may be generated in a conventional manner such as lighting off and then regenerating a spent filter of zone one 50. Any CO escaping from zone two is oxidized in zone three 62 when it is contacted with an oxidizing catalyst, i.e., platinum.

As an alternative to the CO, a hydrocarbon fuel, introduced into the exhaust upstream, was equally effective in reducing $NO_x$ levels.

Any one of the known catalytic actors may be deposited on the nickel foam substrate. However, to test the efficacy of the invention metallic silver was used.

The silver catalyst was prepared by electroplating the nickel sponge from a cyanide bath (minus the brighteners) as described in the U.S. Pat. No. 2,666,738. The procedure calls for one to two microns of silver deposit. A current density of 50 amperes per $m^2$ (0.5 ampere per $dm^2$) applied to the nickel sponge having a surface area 0.8 $dm^2/g$, immersed in an electrolyte containing 45 g/l silver cyanide (AgCN), 115 g/l potassium cyanide (KCN), and 22 g/l potassium carbonate ($K_2CO_3$), has a deposition rate of about 0.319 $dm^{-1}s^{-1}$ at a room temperature of 22° C. The deposit was then annealed in a nitrogen atmosphere at 800° C. for approximately 30 minutes.

EXAMPLE 1

In this example, the reduction of NO (nitric oxide) to $N_2$ was accomplished with the apparatus depicted in FIG. 1 by passing a synthetic diesel exhaust gas containing 4.2% $CO_2$, 5.8% $O_2$, 6.3% $H_2O$, 27 ppm CO and 3700 ppm NO with $N_2$ accounting for the remainder over a silver coated nickel sponge. The catalyst was contained in a steel tube 16 positioned within the furnace 14. The silver catalyst was characterized by a surface area of about 0.4 $m^2/g$ and an average pore diameter of approximately 600 microns. NO conversions were for exhaust gases with space velocities of about 20,000 and 32,000 volume/volume/hour (v./v./h) at 400° C. by collection and high pressure liquid chromotogaphy (HPLC) analysis on scrub solutions from the effluent gases.

Four test runs were conducted. Run 1 was a calibration run. Run 2 was run through the reactor 12 without hexane. Note that no NO reduction occurred. In tests 3 and 4, NO conversion was accomplished. 0.37% (3700 ppm) of hexane ($C_6H_{14}$) was introduced to the synthetic exhaust described above. Table 1 shows that the catalyst described herein is effective for conversion of NO contained in exhaust gases at a temperature of about 400° C.

TABLE 1

| Run | Cat. Temp. (°C.) | Space Vel. (v.v$^{-1}$h$^{-t}$) | Hexane | NO Conversion after 30 Minutes Operation |
|---|---|---|---|---|
| 1 | 22* | 20,000 | 0.0 | 0.0 |
| 2 | 415** | 20,000 | 0.0 | 0.0 |
| 3 | 422 | 20,000 | 0.15 | 2.0 |
| 4 | 422 | 32,000 | 0.37 | 53.6 |

*By-Pass run. The exhaust gases were routed through line 30 to calibrate the analyzer 34.
**Blank run. The exhaust gases were routed through the reactor 14 without a reducing agent.

EXAMPLE 2

In another series of tests, effective reduction of NO to $N_2$ was accomplished by passing a synthetic diesel exhaust gas containing 5.7% $CO_2$, 8.0% $O_2$, 7.9% $H_2O$, 0.52% CO, 0.52% & 0.78% NO (CO=NO & 1.5×NO), with the remainder being $N_2$, through the silver nickel foam catalyst 16 at 400° C. with and without the introduction of additional carbon monoxide. Table 2 shows that the catalyst described herein is effective in the conversion of NO contained in exhaust gases at about 400° C. Carbon monoxide was added in a 1:1 and 1:1.5 ratio of NO:CO. NO reduction appeared to be just as effective as it was with hexane (fuel) as a reducing agent.

TABLE 2

| Cat. Temp. (°C.) | Space Vel. (v.v$^{-1}$h$^{-1}$) | CO added (%) | NO Conversion After 30 minute operation (%) |
| --- | --- | --- | --- |
| 22* | 19,500 | 0.0 | 0.0 |
| 423** | 19,500 | 0.0 | 0.0 |
| 374 | 24,000 | 0.52 | 53.1 |
| 393 | 25,000 | 0.73 | 61.7 |

*By -Pass run. The exhaust gases were routed through line 30 to calibrate the analyzer 34.
**Blank run. The exhaust gases were routed through the reactor 14 without a reducing agent.

While in accordance with the provisions of the statute, there is illustrated and described herein specific embodiments of the invention, those skilled in the art will understand that changes may be made in the form of the invention covered by the claims an that certain features of the invention may sometimes be used to advantage without a corresponding use of the other features.

The embodiments of the invention in which an exclusive property or privilege is claimed are defined as follows:

1. A process for reducing the nitrogen oxide content of an exhaust gas stream generated by an internal combustion engine, said stream containing 5.8 to 8% oxygen, the process consisting essentially of:
   a) contacting the stream with a silver catalyst supported on a nickel coated foam,
   b) introducing a reducing agent selected from the group consisting of hydrocarbon fuels, carbon monoxide, urea and ammonia into the exhaust gas stream, and
   c) maintaining the process temperature between about 200° C. to about 600° C.

2. A process for the treatment of diesel engine exhaust gas having 5.8 to 8% oxygen, the process consisting essentially of contacting the gas with a silver catalyst deposited on a nickel foam substrate in the presence of a reducing agent selected from the group consisting of hydrocarbon fuels, carbon monoxide, urea and ammonia at a temperature of about 200° C. to about 600° C. and removing at least a portion of the nitrogen oxides in the gases.

* * * * *